(12) United States Patent
Melsa et al.

(10) Patent No.: US 7,274,732 B2
(45) Date of Patent: Sep. 25, 2007

(54) ECHO CANCELLATION IN COMMUNICATION SYSTEMS WITH ASYMMETRIC DATA RATES

(75) Inventors: Peter J. Melsa, Niles, MI (US); Thomas N. Zogakis, Mountain View, CA (US)

(73) Assignee: Texas Instruments Incorporated, Dallas, TX (US)

( * ) Notice: Subject to any disclaimer, the term of this patent is extended or adjusted under 35 U.S.C. 154(b) by 746 days.

(21) Appl. No.: 10/393,745

(22) Filed: Mar. 21, 2003

(65) Prior Publication Data

US 2004/0184519 A1   Sep. 23, 2004

(51) Int. Cl.
H04B 1/38 (2006.01)
H04L 5/16 (2006.01)

(52) U.S. Cl. ............... 375/222; 375/219; 375/257; 379/90.01; 379/406.01

(58) Field of Classification Search ............. 375/222, 375/219, 257; 379/90.01, 406.01
See application file for complete search history.

(56) References Cited

U.S. PATENT DOCUMENTS

| | | | | |
|---|---|---|---|---|
| 4,698,696 A | * | 10/1987 | Matsuo | 386/114 |
| 5,271,057 A | * | 12/1993 | Addeo et al. | 379/202.01 |
| 5,610,776 A | * | 3/1997 | Oh | 360/53 |
| 5,673,290 A | | 9/1997 | Cioffi | 375/260 |
| 5,751,188 A | * | 5/1998 | Guegnaud et al. | 329/323 |
| 5,787,113 A | | 7/1998 | Chow et al. | 375/219 |
| 5,864,545 A | * | 1/1999 | Gonikberg et al. | 370/286 |
| 5,872,480 A | | 2/1999 | Huang | 329/304 |
| 6,072,782 A | | 6/2000 | Wu | 370/286 |
| 6,363,033 B1 | * | 3/2002 | Cole et al. | 367/138 |
| 6,480,532 B1 | | 11/2002 | Vareljian | 375/222 |
| 6,597,787 B1 | * | 7/2003 | Lindgren et al. | 379/406.05 |
| 6,625,279 B1 | * | 9/2003 | Eom | 379/406.01 |
| 6,778,599 B1 | * | 8/2004 | Doron | 375/232 |
| 6,895,040 B2 | * | 5/2005 | Zhou | 375/220 |
| 6,947,395 B1 | * | 9/2005 | Popovic et al. | 370/286 |
| 2002/0009057 A1 | | 1/2002 | Blackwell et al. | 370/286 |
| 2003/0012364 A1 | * | 1/2003 | Lee | 379/402 |
| 2003/0016815 A1 | | 1/2003 | Kurtz et al. | 379/406.01 |
| 2003/0038660 A1 | * | 2/2003 | Dormitzer et al. | 327/156 |
| 2003/0039319 A1 | * | 2/2003 | Engelse et al. | 375/316 |

(Continued)

FOREIGN PATENT DOCUMENTS

KR   2001019438 A  *  3/2001

OTHER PUBLICATIONS

KeyWave II Quad AFE, Product Flyer, Fujitsu Microelectronics, found at http://www.fujitsu.com/downloads/MICRO/fme/adsl/mb86628_pf0201.pdf.*

(Continued)

*Primary Examiner*—David C. Payne
*Assistant Examiner*—Erin M. File
(74) *Attorney, Agent, or Firm*—Steven A. Shaw; W. James Brady; Frederick J. Telecky, Jr.

(57) ABSTRACT

A communication device (e.g., a modem) is disclosed as including logic that processes a transmit signal before providing a signal to an echo canceler. The processing may include low pass filtering and decimation of the transmit signal. The low pass filter's cut-off frequency preferably is less than the sampling rate associated with the transmit signal.

9 Claims, 1 Drawing Sheet

U.S. PATENT DOCUMENTS

2003/0214903 A1* 11/2003 Lee .......................... 370/201
2003/0225807 A1* 12/2003 Efland ...................... 708/404
2004/0095994 A1* 5/2004 Dowling ................... 375/222
2004/0114542 A1* 6/2004 Stopler ..................... 370/286
2004/0114750 A1* 6/2004 LeBlanc et al. ....... 379/387.02

OTHER PUBLICATIONS

Thomas J. J. Starr, John M. Coffi, and Peter Silverman; *Understanding Digital Subscriber Line Technology*; (5 p.); 1999. Only p. 140-142.

* cited by examiner

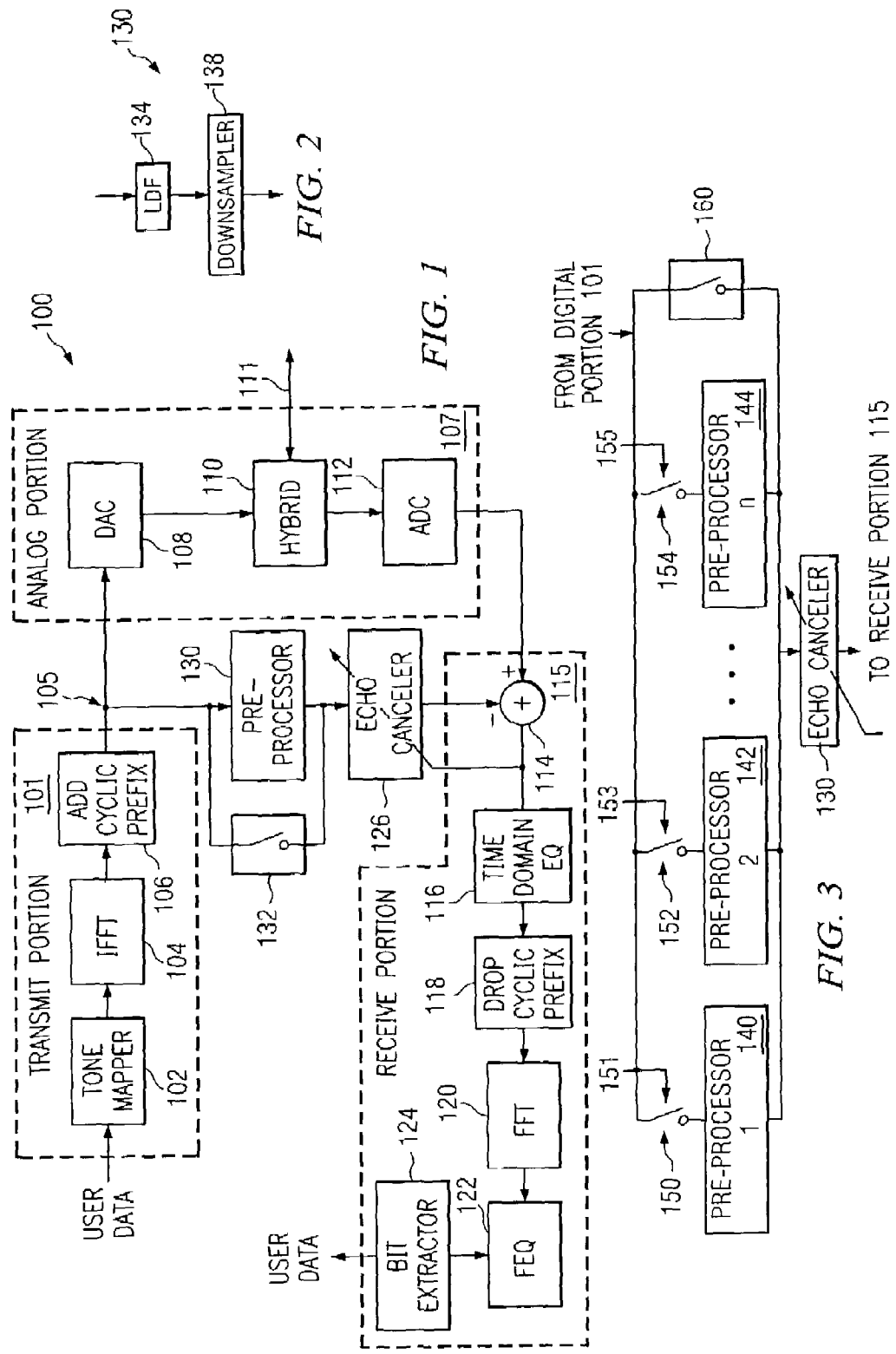

ECHO CANCELLATION IN COMMUNICATION SYSTEMS WITH ASYMMETRIC DATA RATES

BACKGROUND OF THE INVENTION

1. Field of the Invention

The present invention generally relates to communication systems. More particularly, the invention generally relates to controlling echo cancellation in a communication system.

2. Background Information

Some communication systems permit devices to communicate with each other via a "two-wire" line. Signals may be transmitted bi-directionally over the two-wire line from one device to the other, and vice versa. That is, bi-directional data may be present simultaneously on the same wire. One or both devices, however, may include a "hybrid" circuit to permit the conversion from a two-wire external line having both transmit and receive data to two separate communication paths within the communication device a transmit path including outgoing transmit data and a receive path including incoming receive data. The hybrid places the outgoing transmit data from the communication device's transmit path onto the common two-wire line and extracts the incoming receive data from the two-wire line and provides the extracted data to the communication device's receive path. As such, both transmit and receive data are processed by the hybrid.

An issue with such a communication system is "echo." An echo generally is a reflection of the outgoing transmit signal which undesirably manifests itself through the hybrid as a signal that is superimposed on the incoming receive signal. It is thus desirable to reduce or eliminate the echo signal from the receive signal. Improvements in the area of echo cancellation is desirable.

BRIEF SUMMARY

The problem described above may be solved by a communication device that includes logic that pre-processes a transmit signal before providing a signal to an echo canceler. The pre-processing may include low pass filtering and decimation of the transmit signal. The low pass filter's cut-off frequency preferably is less than the sampling rate of the transmit signal.

In accordance with some embodiments, the communication device may comprise a modulator/demodulator ("modem"). The modem may comprise a transmit portion in which transmit data at a first sampling rate is capable of being processed, a receive portion in which receive data at a second sampling data rate is capable of being processed, and an analog portion coupled to the transmit and receive portions. The analog portion may be capable of providing the transmit data from the transmit portion to an external communication link and providing receive data from the communication link to the receive portion. The modem may also include an echo canceler coupled to the receive portion and a pre-processor coupled to the transmit portion and to the echo canceler. The pre-processor may be capable of downsampling said transmit data to be provided to said echo canceler.

BRIEF DESCRIPTION OF THE DRAWINGS

For a detailed description of the preferred embodiments of the invention, reference will now be made to the accompanying drawings in which:

FIG. 1 illustrates a block diagram of a communication device employing an echo cancellation pre-processor in accordance with a preferred embodiment of the invention;

FIG. 2 shows an implementation of the echo cancellation pre-processor of FIG. 1 in accordance with a preferred embodiment of the invention; and FIG. 3 shows an alternative embodiment of a communication device having a plurality of echo cancellation pre-processors.

NOTATION AND NOMENCLATURE

Certain terms are used throughout the following description and claims to refer to particular system components. As one skilled in the art will appreciate, different companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to.". Also, the term "couple" or "couples" is intended to mean either a direct or indirect connection. Thus, if a first device couples to a second device, that connection may be through a direct connection, or through an indirect connection via other devices and connections. The term "portion" as used herein refers to an electrical component or group of electrical components that operate together to generally perform a function. To the extent that any term is not specially defined in this specification, the intent is that the term is to be given its plain and ordinary meaning.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Referring to FIG. 1, a communication device 100 is shown configured in accordance with a preferred embodiment of the invention. The device 100 may be representative of a variety of different types of communication devices such as, and without limitation, an asymmetric digital subscriber line ("ADSL") modulator/demodulator ("modem") which permits communication with another compatible device. Without loss of generality, device 100 will be referred to as a modem herein.

Modem 100 may include a transmit portion 101, an analog portion 107, and a receive portion 115. The transmit portion 101 may include a tone mapper 102, an inverse fast Fourier transformer ("IFFT") 104, and add cyclic prefix logic 106. The analog portion 107 may include a digital-to-analog converter ("DAC") 108, a hybrid 110, and an analog-to-digital converter ("ADC") 112. Further, the receive portion 115 may include a time domain equalizer 116, drop cyclic prefix logic 118, fast Fourier transformer ("FFT") 120, a frequency equalizer 122, and a bit extractor 124. In accordance with the preferred embodiments of the invention, the modem 100 also may include an echo canceler 126 and an echo canceler pre-processor 130. Different, or additional, components may be included in modem 100 as desired and the components included may be configured differently from that shown in FIG. 1.

Modem 100 may be representative of any type of modem or transceiver (collectively referred to herein as "modems"). Without limitation, modem 100 may have a user data rate associated with data processed in the transmit portion 101 that is different from the user data rate associated with data processed in the receive portion 115. As used herein, the term "sample (or sampling) rate" refers to the rate at which the modem's analog-to-digital conversion or digital-to-analog conversion occurs. As such, the modem's transmit portion may have an associated sampling rate and the modem's receive portion also may have an associated sampling rate. The two sampling rates may be the same or different. A non-limiting example of such a modem is an asymmetric digital subscriber line ("ADSL") modem. In a typical ADSL modem, the transmit portion's sampling rate may be different (typically greater) than the receive portion's sampling rate with the modem operating at a service center. Thus, the transmit user data rate may be less than the receive user data rate.

Referring still to FIG. 1, the tone mapper 102 maps the bits comprising the input user data to one or more "tones" in accordance with whatever encoding scheme is implemented by the tone mapper 102. By way of example, the tone mapper 102 may comprise quadrature amplitude modulation ("QAM") or other modulation techniques. The IFFT 104 performs an inverse fast Fourier transform on data from the tone mapper 102. The IFFT converts data from the frequency domain to the time domain. The add cyclic prefix logic 106 generally duplicates the end portion of the time domain signal and prepends it to the beginning of the time domain signal. The cyclic prefix logic 106 may be included to enable the frequency domain equalization that occurs in the receiver.

The digital output bits from the add cyclic prefix logic 106 may be provided to the DAC 108 which converts the bits to an analog format. The DAC 108 then provides the analog signal to the hybrid 110. Hybrid 110 transmits the analog transmit signal to a remote device (not shown) via communication link 111.

Incoming analog receive data on link 111 from a remote device into the hybrid 110 is provided by the hybrid to the ADC 112. The ADC 112 may convert the receive data to a digital format and provide the analog signal to the time domain equalizer 116. The time domain equalizer 116 may be included to shorten the period of intersymbol interference to less than the length of the cyclic prefix as would be known by those skilled in the art. The cyclic prefix added by add cyclic logic 106 may be stripped out in the receive portion's drop cyclic prefix logic 118 following the time domain equalization. The data then may be processed by FFT 120 which converts the time domain data to the frequency domain. The FEQ 122 receives the frequency domain signal and equalizes the magnitude and phase distortion introduced by the channel. The bit extractor 124 then may convert the data from the FEQ 122 to user data in a de-mapping process that generally undoes the mapping process of tone mapper 102. Any of a variety of implementations may be used for any of the components shown in FIG. 1. Such components are generally widely known by those of ordinary skill in the art. Reference may be made to U.S. Pat. Nos. 5,673,290 and 5,787,113, both of which are incorporated herein by reference.

As noted above, modem 100 may include an echo canceler pre-processor 130 and an echo canceler 126. The echo canceler 126 generally counteracts the detrimental effects of an echo signal that may superimpose itself on a desired signal. In general, an echo signal comprises a filtered version of the transmitted signal from the transmit portion 101 that migrates its way through the hybrid 110 onto the receive signal in receive portion 115. Echo canceler 126 may adaptively construct an estimate of the filtered echo signal. The estimated echo signal from the echo canceler 126 then may be subtracted from the received signal (which includes legitimate receive data and the undesired echo signal) by logic 114 which may comprise a subtracter.

As can be seen in FIG. 1, the echo canceler 126 is generally coupled to both the transmit portion 101 and the receive portion 115. In some modems (e.g., ADSL), the sampling rate associated with the transmit portion may differ from (e.g., be higher than) that of the receive portion. This asymmetry means that a conventional echo canceler may have to work with data at two different sampling rates. For an existing echo canceler design and a given transmit sampling rate-to-receive sampling rate ratio, if the sampling rate of the transmit portion is increased relative to the receive portion's sampling rate, the existing echo canceler may not work properly.

In accordance with the preferred embodiments of the modem 100, the echo canceler pre-processor 130 may be included. The pre-processor 130 may process the transmit portion signal received from node 105 to convert the signal to an appropriate format for the echo canceler 126. An appropriate pre-processor 130 may be included in modem 100 to permit any of a variety of echo cancelers to function properly in the modem. The pre-processor 126 advantageously avoids the necessity of having to develop a more complex echo canceler as modems may be developed in which the ratio of transmit to receive data changes. It should also be understood that the motivations for including the echo canceler pre-processor 130 should not be used to limit the scope of this disclosure, including the claims, in any way.

Referring now to FIG. 2, pre-processor 130 may include a low pass filter 134 coupled to a downsampler (or decimator) 138. The low pass filter 134 may be implemented in a variety of ways, such as, and without limitation, with a finite impulse response ("FIR") filter. It has been observed for a typical ADSL modem that echo signals are generally limited to frequencies below about 300 KHz. As such, in some embodiments, the cut-off frequency of the low pass filter 134 may be about 300 KHz. In general, the frequency response of the filter 134 is set so as to include the frequency range associated with echo signals and generally will be less than the transmit portion's sampling rate.

The downsampler 138 generally decimates the signal from low pass filter 134 by a value of N. In some embodiments, the value N may be 2, but can be other values as desired. With a value of 2, the downsampler 138 generally passes every other sample from the incoming filtered data from the filter 134 to the receive portion 115.

Referring again to FIG. 1, a bypass circuit 132 may be included to bypass the operation of the pre-processor 130. The bypass circuit 132 may comprise a switch or other suitable logic. The bypass circuit 132 may selectively permit the modem 100 to use the echo canceler 126 with or without the action of the pre-processor 130, thereby providing modem 100 with flexibility as to the use of the echo canceler 130. For example, the echo canceler 130 may be designed for a particular transmit sampling rate. If the transmit portion 101 operates at that particular sampling rate, modem 100, via logic not specifically shown, may close bypass switch 132 (or keep switch 132 closed if already closed) so as to permit the echo canceler 126 to work with the transmit data without the action of the pre-processor 130. If, however, the sampling rate associated with the transmit portion 101 exceeds that for which the echo canceler was designed, the modem 100 may open bypass switch 132 (or leave switch 132 open if already open) to permit the transmit data to be processed by the pre-processor 130.

FIG. 3 shows an alternative embodiment of a portion of modem 100 which includes a plurality of echo cancellation pre-processors 140, 142, 144. Any number of pre-processors (one or more) may be included. Each pre-processor 140-144 may include a low pass filter and downsampler as discussed above. Both the frequency response of the filter and downsampler in each pre-processor 140-144 may differ from one or more of the other pre-processors. In some embodiments, however, the frequency response of the low pass filter in each pre-processor may be approximately the same. In such embodiments, the downsampler included in each pre-processor 140-144 may differ, with the downsampler of each pre-processor decimating the incoming data by an amount that differs from other pre-processors. A switch 150-154 may be included in series with each pre-processor 140-144. Switches 150-154 may be controlled by control lines 151, 153 and 155 that permit at least one pre-processor among the plurality of pre-processors to be selected for use as described above. In some embodiments, only one pre-processor is selected at a time. A bypass circuit 160 also may be provided in the embodiment of FIG. 3 to enable the flexibility of avoiding the use of any of the pre-processors 140-144 as described previously. The bypass circuit 160 may comprise a switch which, when closed, bypasses the all of the pre-processors 140-144. In the embodiment of FIG. 3, a preprocessor may be included for each transmit sampling rate that is, or may be, implemented in the modem 100. In accordance with other embodiments, the modem may include a programmable low pass filter and a downsampler with a selectable decimation rate. For example, with regard to FIG. 2, the low pass filter 134 and downsampler 138 each may be programmable.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A modem, comprising:
   a transmit portion in which transmit data at a first sampling rate is capable of being processed;
   a receive portion in which receive data at a second sampling rate is capable of being processed, wherein the first sampling rate is different than the second sampling rate;
   an analog portion coupled to said transmit and receive portions, said analog portion capable of providing said transmit data from the transmit portion to a communication link and capable of providing receive data from said communication link to said receive portion port;
   an echo canceler coupled to said receive portion; and
   a plurality of pre-processors coupled to said transmit portion and to said echo canceler, each pre-processor capable of downsampling said transmit data to be provided to said echo canceler.

2. The modem of claim 1 wherein each of said plurality of pre-processors includes a low pass filter.

3. The modem of claim 2 wherein said low pass filter is programmable.

4. The modem of claim 1 wherein each of said plurality of pre-processors is capable of downsampling said transmit data at a programmable rate.

5. The modem of claim 2 wherein said low pass filter includes a cut-off frequency of 300 KHz.

6. The modem of claim 1 further including a bypass circuit coupled to said pre-processors, said bypass circuit controllable to permit said preprocessors to downsample said transmit data or to preclude said pre-processors from downsampling said transmit data.

7. The modem of claim 1 wherein each pre-processor is capable of downsampling at a rate that differs from at least one of the other preprocessors.

8. The modem of claim 7 further including a bypass circuit coupled to said plurality of pre-processors, said bypass circuit controllable to permit any of said preprocessors to down sample said transmit data or to preclude all of said pre-processors from downsampling said transmit data.

9. The modem of claim 1 wherein each of said plurality of pre-processors includes a law pass filter having a cut-off frequency that is lower than the sampling rate of the transmit data.

* * * * *